United States Patent Office 3,299,163
Patented Jan. 17, 1967

3,299,163
REMOVAL OF CONTAMINANTS FROM UNSATURATED HYDROCARBON-CONTAINING MIXTURES
Robert P. Zelinski, Bartlesville, Okla., assignor to Phillips Petroleum Company, a corporation of Delaware
No Drawing. Filed Aug. 30, 1965, Ser. No. 483,846
10 Claims. (Cl. 260—681.5)

This invention relates to the purification of unsaturated hydrocarbon-containing mixtures to remove undesirable contaminants therefrom. In accordance with one aspect, the invention relates to a method of removing unsaturates such as 1,2-dienes and 1-acetylenes from conjugated diene mixtures containing same by contacting the mixture at an elevated temperature with an alkali metal hydroxide solution of glycol, amine, or thiol, or mixtures thereof. In accordance with another aspect, the invention relates to a polymerization process in which the conjugated diene to be polymerized is pretreated with an alkali metal hydroxide solution of a glycol, amine or thiol or mixtures thereof prior to contact with the polymerization catalyst. The removal of contaminants such as 1,2-dienes and acetylenic compounds from conjugated diene-containing streams, especially 1,3-butadiene has been a major problem in the industry and has received much consideration. Hydrogenation followed by extensive fractionation has been employed to remove or reduce the quantities of these materials present in by-product butadiene, for example, such as that obtained from naphtha cracking operations.

The present process provides a method whereby 1,2-dienes such as allene and 1,2-butadiene, and 1-acetylenes such as vinylacetylene, methylacetylene, 1-butyne and the like can be removed from conjugated diene mixtures containing them without the necessity for hydrogenation and extensive fractionation. There is thus provided a means whereby a substantial reduction in plant investment and utilities is realized.

Accordingly, an object of this invention is to provide a simplified process for removing contaminants from unsaturated hydrocarbon-containing mixtures such as polymerization feeds.

Another object of this invention is to provide an improved process for removing 1,2-dienes and 1-acetylenes from conjugated diene-containing mixtures to provide a highly purified conjugated diene-containing stream.

A further object of this invention is to provide a process for polymerizing conjugated dienes in which the conjugated dienes are pretreated prior to contact with the polymerization catalyst so as to thereby obtain rubbery polymer products having desirable physical properties.

Other and further objects and advantages of this invention will become apparent to those skilled in the art by the consideration of the accompanying disclosure and the appended claims.

According to the invention, unsaturated hydrocarbon-containing mixtures such as conjugated 1,3-diene mixtures containing 1,2-dienes and 1-acetylenes are contacted at a temperature of at least 100° C. with an alkali metal hydroxide solution of a compound selected from glycols, amines, and thiols, and mixtures of these to effect a substantial reduction in quantities of the compounds containing 1,2-dienes and 1-acetylenes. The process is of particular importance for removing compounds such as allene, 1,2-butadiene, vinylacetylene, methylacetylene, and 1-butyne from butadiene-containing mixtures.

In actual operation, contacting of a conjugated diene-containing mixture to remove 1,2-dienes and 1-acetylenes can be effected by any suitable method known in the art. The mixture to be treated can be in either the gaseous or liquid phase and any necessary pressure adjustments made for separation of the monomer from the treating solution.

One convenient method is to introduce the conjugated diene mixture in the gaseous state into the treating solution in the column or other suitable arrangement. The process is frequently conducted in a series of contactors or treating columns, each containing a portion of the treating solution, in order to facilitate contact with the material being treated.

According to the invention, solutions of one or more alkali metal hydroxides in a glycol, amine, or a thiol, or mixtures of any of these materials, as more fully described hereinafter, are employed as treating agents. While any of the alkali metal hydroxides can be employed, sodium hydroxide and potassium hydroxide are presently preferred. Thus, alkali metal hydroxides dissolved in glycols, primary amines, secondary amines, polyamines, monothiols, dithiols, and mixtures of any of these materials are applicable as treating agents in this invention. The solvents employed preferably have a boiling point of at least 100° C. at atmospheric pressure in order that the solvent will not be carried overhead along with the conjugated diene, e.g., 1,3-butadiene, during the treating process.

Glycols, amines, or thiols used as solvents having from 2–20 carbon atoms per molecule can be employed according to the invention. Various types of materials that can be used as solvents include alkylene glycols, polyalkylene glycols, primary amines, secondary amines, polyamines, monothios, dithiols, and mixtures of any of these materials.

Alkylene glycols and polyalkylene glycols that can be employed in the invention are represented by the formula HO—R—OH where R is an alkylene radical, straight or branched chain, or an alkylene radical in which one or more —O— groups is substituted for one or more carbon atoms and each pair of oxygen atoms is separated by at least two carbon atoms. Illustrative of these compounds are the following:

1,2-ethanediol (ethylene glycol)
1,2-propanediol
1,3-propanediol
1,4-butanediol
1,2-butanediol
1,3-butanediol
1,2-pentanediol
1,5-pentanediol
2,3-pentanediol
2,4-pentanediol
1,6-hexanediol
2,4-hexanediol
1,8-octanediol
4,5-octanediol
1,10-decanediol
1,15-pentadecanediol
5,7-diisopropyl-5,7-hendecanediol
1,10-eicosanediol
3-ethyl-2,4-pentanediol
3,6-di-n-propyl-1,5-nonanediol
5,5,9,9-tetramethyl-6,8-hexadecanediol
3-oxa-1,5-pentanediol (diethylene glycol)
3,6-dioxa-1,8-octanediol (triethylene glycol)
4,8,12-trioxa-1,15-pentadecanediol
5,10,15-trioxa-1,8-nonadecanediol
3,9,15-trimethyl-6,12-dioxa-1,17-heptadecanediol
2,5,8,11-tetramethyl-3,6,9,12-tetroxa-1,14-pentadecanediol and the like.

Primary and secondary amines that can be employed according to the invention are represented by the formulas R'—NH$_2$ and

where R' is a hydrocarbon radical selected from the group consisting of saturated aliphatic, saturated cycloaliphatic, and aromatic radicals, and mixtures thereof. Illustrative of these compounds are the following:

1-aminopentane (n-amylamine)
N-methyl-2-aminopentane
di-n-propylamine
n-Hexylamine
diisobutylamine
4-aminoheptane
di-n-butylamine
2-aminohendecane
1-aminododecane
1-aminopentadecane
5-aminoheptadecane
1-aminoheptadecane
10-aminoeicosane
4,8-di-n-butyl-6-aminododecane
1-aminoeicosane
N-n-amyl-5-aminononane
N-tert-butyl-5-amino-3,7-dimethyldecane
cyclohexylamine
N-methylcyclohexylamine
N-n-amyl-1-amino-3,4-di-n-amylcyclopentane
aniline
N-methylaniline
N-ethyl-4-dodecylphenylamine
2,4,6-tri-n-propylphenylamine
benzylamine
1-aminonaphthalene
4,5-diethyl-2-aminonaphthalene
N-ethyl-1-naphthylamine
3-phenylpropylamine
α,α-dimethylbenzylamine
3-(3,5-di-n-butylphenyl)propylamine and the like.

Polyamines that can be employed according to the invention are represented by the formula

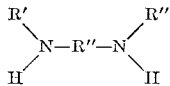

wherein R'' is a straight or branched chain alkylene, cycloalkylene, or arylene radical which can contain one or more

groups, or an alkylene radical in which one or more

groups is substituted for one or more carbon atoms with each pair of nitrogen-containing groups separated by at least two carbon atoms, and R' is as hereinbefore defined. Illustrative of these compounds are the following:

ethylenediamine (1,2-diaminoethane)
1,3-diaminopropane
1,3-diaminobutane
1,5-diaminopentane
2,5-diaminoheptane
1,10-diaminodecane
1,2,3-triaminopropane
1,5,9-triaminopentadecane
N,N'-di-n-amyl-1,7-diaminoheptane
N-cyclohexyl-5-aminotetradecane
1,20-diaminoeicosane
1,4-diaminocyclohexane
N,N'-di-n-hexyl-1,4-diaminocyclooctane
1,3-diaminobenzene
N-methyl-1,8-diaminonaphthalene
diethylenetriamine
triethylenetetramine
tetraethylenepentamine
heptaethyleneoctamine
N,N',N''-trimethyl-4,8,12-triazopentadecane
N-(4-cyclohexyl)1,12-diaminododecane
N,N'-diphenyl-1,8-diaminooctane
N,N'-di(4-tolyl)-2,4-diaminohexane
N-benzyl-1-aminononane and the like.

Monothiols and dithiols that can be employed according to the invention are represented by the formulas R'SH and HS—R'''—SH where R' is as hereinbefore defined and R''' is a straight or branched chain alkylene, cycloalkylene, or arylene radical. Illustrative of these compounds are the following:

2-butanethiol
2-methyl-1-butanethiol
3-methyl-1-butanethiol
3-hexanethiol
1-dodecanethiol
5-pentadecanethiol
1-tetradecanethiol
1-octadecanethiol
10-eicosanethiol
3-phenyl-3-hexanethiol
6-(4-tolyl)1-hexanethiol
1,8-dicyclohexyl-4-octanethiol
5-cyclopentyl-1-dodecanethiol
3,5,7-triethyl-1-nonanethiol
1,2-ethanedithiol
1,3-propanedithiol
1,4-butanedithiol
1,8-octanedithiol
1,12-dodecanedithiol
3,6-diethyl-3,6-octanedithiol
5-(3,5-dimethylphenyl)3,10-dodecanedithiol
3-cyclohexyl-1,6-hexanedithiol
1,2-benzenedithiol
1,4-cyclohexanedithiol and the like.

The concentration of the alkali metal hydroxide treating solution according to the invention will depend on its solubility in the particular solvent utilized. Generally, the concentration will be in the range of 0.1 to 1 molar, but can be outside this range when desired.

The rate of introduction or contact time for the conjugated diene-containing stream being treated can vary over a considerable range. When passing a gaseous conjugated diene stream through a solution of a treating agent, flow rates are generally in the range of 0.2 to 10 gas volumes per volume of treating solution per hour, preferably in the range of 0.5 to 5 gas volumes per volume of treating solution per hour. Flow rates outside these ranges can be used when desired.

Treating temperatures generally are in the range of 100–250° C., preferably in the range of 125–200° C. The treating temperature is at least 100° C. The process can be conducted at atmospheric or superatmospheric pressure.

This invention is of particular importance for purifying by-product butadiene streams to render the butadiene suitable for use in, say, organo-metallic polymerization systems. The process of the invention can be used to replace the separate steps of selective hydrogenation of acetylenes and subsequent fractionation to remove 1,2-dienes. After treatment according to the invention, light ends can be removed as desired by conventional methods, including fractionation and other known procedures.

Monomer streams treated according to the invention comprise conjugated dienes containing from 4–10 inclusive carbon atoms. Examples of conjugated dienes which can be used include 1,3-butadiene
2-methyl-1,3-butadiene (isoprene)
2,3-dimethyl-1,3-butadiene
1,3-pentadiene
2-methyl-1,3-pentadiene
2,3-dimethyl-1,3-pentadiene
3-methyl-1,3-pentadiene
2-phenyl-1,3-butadiene and the like.

This invention is applicable to the polymerization of the above-defined conjugated dienes either alone or in admixture with each other and/or with one or more compounds containing an active $CH_2=C<$ group which are copolymerizable therewith.

After treatment of the conjugated dienes with the alkali metal hydroxide solution of a glycol, amine or thiol as defined herein, the polymerization is effected by contacting the conjugated dienes with a polymerization catalyst. Catalysts that can be used in the practice of the process of this invention are, in general, those which are effective for polymerizing conjugated dienes to solid polymers. It is often preferred to employ a catalyst comprising a member selected from the group consisting of organo metals or metal hydrides. However, other catalysts can be used when desired. The process itself can be carried out under well-known polymerization conditions.

*Specific example*

A sample of by-product butadiene obtained from naphtha cracking containing 1,2-dienes and acetylenes was purified by passing it through a 0.1 molar solution of potassium hydroxide in ethylene glycol. Eight treaters were arranged in series, each containing a portion of the KOH-glycol mixture. A flow meter was provided at the inlet to the treating train to measure the flow rate of the gaseous butadiene mixture. Temperature was maintained at 160° C. throughout the operation. The gaseous butadiene stream was passed through the treating train at the rate of approximately 0.78 gas volume per volume of treating solution per hour. A GLC analysis was run on the original material and also on the treated product. The following table gives amounts of the 1,2-dienes and 1-acetylenes before and after treatment and also shows the percentage reduction in quantities of the various materials as a result of the treatment.

|  | Before Treatment | After Treatment | Percent Reduction |
|---|---|---|---|
| 1,3-Butadiene, Percent | 34.4 | 34.4 | |
| Allene, Percent | 0.24 | 0.024 | 90 |
| Methylacetylene, Percent | 0.31 | 0.10 | 67.7 |
| Vinylacetylene, Percent | 0.28 | 0.063 | 77.5 |
| 1-Butyne, p.p.m | 500 | 412 | 17.6 |
| 1,2-Butadiene, p.p.m | 250 | 194 | 22.4 |

These data show the substantial reduction in amounts of 1,2-dienes and 1-acetylenes as a result of the KOH-glycol treatment of the by-product butadiene.

Reasonable variation and modification are possible within the scope of the foregoing disclosure and the appended claims to the invention, the essence of which is that the process is provided for removing contaminates, especially unsaturated hydrocarbon contaminants such as 1,2-dienes and 1-acetylenes from unsaturated mixtures containing same, especially conjugated 1,3-diene-containing mixtures which comprise contacting same with an alkali metal hydroxide solution of a glycol, amine or thiol, or a mixture of these at a temperature of at least 100° C. as the contacting temperature.

I claim:

1. A process for separating polyenes and acetylenic compounds from a conjugated diene mixture containing same which comprises contacting said mixture at a temperature above 100° C. with an alkali metal hydroxide solution of a compound selected from the group consisting of alkylene and polyalkylene glycols, primary, secondary and polyamines having from 2–20 carbon atoms per molecule, and mixtures of these.

2. A process according to claim 1 wherein said mixture comprises butadiene.

3. A process for separating 1,2-dienes and 1-acetylenes from a conjugated diene mixture containing same which comprises contacting said mixture at a temperature in the range of 100–250° C. with a 0.1 to 1 molar alkali metal hydroxide solution of a compound selected from the group consisting of alkylene and polyalkylene glycols, primary, secondary and polyamines having from 2–20 carbon atoms per molecule, and mixtures of these.

4. A process for separating 1,2-dienes and 1-acetylenes from 1,3-butadiene stream containing same which comprises passing said stream at a temperature in the range of 125–200° C. in the gaseous state through 0.1 to 1 molar alkali metal hydroxide solution of a compound selected from the group consisting of alkylene and polyalkylene glycols, primary, secondary and polyamines having from 2–20 carbon atoms per molecule.

5. A process according to claim 4 wherein said alkali metal is selected from sodium and potassium.

6. A process for separating 1,2-dienes and 1-acetylenes from a 1,3-butadiene stream containing same which comprises passing said stream at a temperature in the range of 125–200° C. in the gaseous state through a potassium hydroxide-ethylene glycol mixture.

7. A process for separating 1,2-dienes and 1-acetylenes from a 1,3-butadiene stream containing same which comprises passing said stream at a temperature in the range of 125–200° C. in the gaseous state through a potassium hydroxide-triethylenetetramine mixture.

8. A process for separating 1,2-dienes and 1-acetylenes from a conjugated diene mixture containing same which comprises passing said mixture at a temperature in the range of 100–250° C. through a series of contacting zones containing an alkali metal hydroxide solution of a compound selected from the group consisting of alkylene and polyalkylene glycols, primary, secondary and polyamines having from 2–20 carbon atoms per molecule, and mixtures of these.

9. A process of purifying a $C_4$–$C_{10}$ conjugated diene polymerization feed containing polyenes and acetylenic compounds that are contaminants in the subsequent polymerization which comprises contacting said feed at a temperature above 100° C. with a 0.1 to 1 molar alkali metal hydroxide solution of a compound selected from the group consisting of alkylene and polyalkylene glycols, primary, secondary and polyamines having from 2–20 carbon atoms per molecule, and mixtures of these, to remove said contaminants under conditions to selectively remove said contaminants, and then subjecting said feed substantially freed of contaminants to polymerization conditions.

10. A process according to claim 9 wherein said conjugated diene is butadiene and said contaminants are selected from 1,2-dienes and 1-acetylenes.

No references cited.

DELBERT E. GANTZ, *Primary Examiner.*

G. E. SCHMITKONS, *Assistant Examiner.*